(12) United States Patent
Singh et al.

(10) Patent No.: US 12,308,647 B1
(45) Date of Patent: May 20, 2025

(54) SYSTEMS AND METHODS FOR CORRECTING REACTIVE POWER ANOMALIES IN ELECTRICAL NETWORKS BASED ON DISTRIBUTION MEASUREMENTS

(71) Applicant: EYGS LLP, London (GB)

(72) Inventors: Nishant Singh, Benares (IN); Shubham Khanna, Noida (IN); Aditya Punjabi, Faridabad (IN)

( * ) Notice: Subject to any disclaimer, the term of this patent is extended or adjusted under 35 U.S.C. 154(b) by 0 days.

(21) Appl. No.: 18/962,275

(22) Filed: Nov. 27, 2024

(51) Int. Cl.
| | |
|---|---|
| H02J 3/18 | (2006.01) |
| G05B 13/02 | (2006.01) |
| H02J 3/00 | (2006.01) |
| H02J 13/00 | (2006.01) |

(52) U.S. Cl.
CPC ........ *H02J 3/1878* (2013.01); *G05B 13/0265* (2013.01); *H02J 3/0012* (2020.01); *H02J 13/00002* (2020.01); *H02J 13/00006* (2020.01)

(58) Field of Classification Search
CPC .. H02J 3/1878; H02J 3/0012; H02J 13/00002; H02J 13/00006; G05B 13/0265
See application file for complete search history.

(56) References Cited

U.S. PATENT DOCUMENTS

| | | | | |
|---|---|---|---|---|
| 6,061,609 A | * | 5/2000 | Kanoi ..................... | H02J 3/00 340/567 |
| 8,880,234 B2 | | 11/2014 | Sekoguchi et al. | |
| 10,585,445 B2 | | 3/2020 | Wong et al. | |
| 11,017,485 B2 | | 5/2021 | Riland et al. | |
| 11,157,031 B2 | | 10/2021 | Wong et al. | |
| 11,747,849 B2 | | 9/2023 | Forbes, Jr. | |
| 2009/0228154 A1 | * | 9/2009 | Trias ...................... | H02J 3/00 703/2 |
| 2012/0249092 A1 | * | 10/2012 | Krok ....................... | G06Q 10/06 323/209 |
| 2013/0204554 A1 | * | 8/2013 | Tuckey ................ | G01R 31/2843 702/58 |

(Continued)

OTHER PUBLICATIONS

Chen, Z. et al., "Control and Optimisation of Power Grids Using Smart Meter Data: A Review," Sensors, Feb. 13, 2023, 23(4):2118; 26 pages.

(Continued)

*Primary Examiner* — Kidest Bahta
(74) *Attorney, Agent, or Firm* — COOLEY LLP

(57) ABSTRACT

A non-transitory, processor-readable medium stores instructions that, when executed by a processor, cause the processor to receive electrical measurement data measured at a distribution network of an electrical grid and not a transmission network of the electrical grid. The electrical measurement data is provided as input to a machine learning model to detect a reactive power anomaly that is at the distribution network, and in response to detecting the reactive power anomaly, identify a capacitor bank from a plurality of capacitor banks and associated with the transmission network of the electrical grid. In response to identifying the capacitor bank, the instructions cause the processor to cause the capacitor bank to be one of electrically coupled to the transmission network or electrically decoupled from the transmission network, to mitigate the reactive power anomaly.

19 Claims, 7 Drawing Sheets

(56) References Cited

U.S. PATENT DOCUMENTS

2020/0293033 A1* 9/2020 He .................... G01R 19/2513
2022/0083037 A1* 3/2022 Berry .................. G01R 31/088

OTHER PUBLICATIONS

Karlsson, A., "Guidelines to Implement Monitoring and Remote Control System in an Urban Distribution Grid," KTH Royal Institute of Technology School of Electrical Engineering and Computer Science, Degree Project in Electrical Engineering, Second Cycle, 30 Credits, Stockholm, Sweden, 2020. Retrieved from https://www.diva-portal.org/smash/get/diva2:1521990/FULLTEXT01.pdf, [retrieved on Jan. 27, 2025]; 85 pages.

Khan, I. et al., "Compressive Sensing-Based Optimal Reactive Power Control of a Multi-Area Power System," Institute of Electrical and Electronics Engineers (IEEE) Access, Sep. 14, 2017, vol. 5, pp. 23576-23588.

* cited by examiner

500

Receive electrical measurement data that represents a characteristic of a first portion of an electrical grid and not a second portion of the electrical grid
502

Provide the electrical measurement data as input to a machine learning model to detect a reactive power anomaly within the electrical grid and identify a capacitor bank
504

Trigger a contactor to cause the capacitor bank to be electrically coupled to the second portion of the electrical grid to mitigate the reactive power anomaly
506

Receive electrical measurement data measured at a distribution network of an electrical grid and not a transmission network of the electrical grid
702

Provide the electrical measurement data as input to a machine learning model to (1) detect a reactive power anomaly that is at the distribution network and (2) identify a capacitor bank from a plurality of capacitor banks
704

Cause the capacitor bank to be electrically coupled to the transmission network to mitigate the reactive power anomaly
706

SYSTEMS AND METHODS FOR CORRECTING REACTIVE POWER ANOMALIES IN ELECTRICAL NETWORKS BASED ON DISTRIBUTION MEASUREMENTS

FIELD

One or more embodiments described herein relate to systems and computerized methods for detecting and mitigating reactive power anomalies within electrical power networks.

BACKGROUND

Some known systems monitor power quality within an electrical grid at an upstream, transmission (e.g., feeder) portion (also referred to herein as a transmission network) of the electrical grid and not, for example, at a downstream, distribution (e.g., consumer) portion of the electrical grid. Quality of transmitted electrical power can degrade, however, before the electrical power reaches the distribution portion of the electrical grid, such that electrical power may have degraded quality at the distribution portion while having sufficient quality at the transmission portion of the electrical grid. As a result, these known systems can fail to detect degraded power quality at the distribution portion. A need exists, therefore, for systems and methods that are configured to detect degraded power quality within a distribution portion of an electrical grid and remediate the degraded power quality using at least one device disposed within a transmission portion of the electrical grid.

SUMMARY

According to an embodiment, a method includes receiving, at a processor, electrical measurement data that represents a characteristic of a first portion of an electrical grid and not a second portion of the electrical grid, the first portion of the electrical grid having a first nominal voltage, and the second portion of the electrical grid having at least one second nominal voltage that is higher than the first nominal voltage. The electrical measurement data is provided as input, via the processor, to a machine learning model to (1) detect a reactive power anomaly within the electrical grid and (2) in response to detecting the reactive power anomaly, identify a capacitor bank from a plurality of capacitor banks and associated with the second portion of the electrical grid. In response to identifying the capacitor bank, the method also includes triggering a contactor, via the processor, to cause the capacitor bank to be one of electrically coupled to the second portion of the electrical grid or electrically decoupled from the second portion of the electrical grid, to mitigate the reactive power anomaly.

According to an embodiment, a non-transitory, processor-readable medium stores instructions that, when executed by a processor, cause the processor to receive first electrical measurement data that characterizes a first portion of an electrical grid and not a second portion of the electrical grid, the first portion of the electrical grid having a first nominal voltage, and the second portion of the electrical grid having at least one second nominal voltage that is higher than the first nominal voltage. The instructions also cause the processor to calculate a first reactive power value based on the first electrical measurement data, the first reactive power value being (1) associated with the first portion of the electrical grid and (2) outside of a predefined reactive power value range. The first reactive power value is provided as input to a machine learning model to identify a contactor from a plurality of contactors, each contactor from the plurality of contactors being associated with (1) a capacitor bank different from remaining capacitor banks from a plurality of capacitor banks and (2) the second portion of the electrical grid. In response to identifying the contactor, a signal is sent to the contactor to cause a capacitor bank (1) associated with that contactor and (2) from the plurality of capacitor banks to be one of coupled to the second portion of the electrical grid or decoupled from the second portion of the electrical grid. In response to the signal being sent to the contactor, second electrical measurement data associated with the first portion of the electrical grid is received, and a second reactive power value is calculated based on the second electrical measurement data. The second reactive power value is one of (1) within the predefined reactive power value range or (2) closer to the predefined reactive power value range than the first reactive power value.

According to an embodiment, a non-transitory, processor-readable medium stores instructions that, when executed by a processor, cause the processor to receive electrical measurement data measured at a distribution network of an electrical grid and not a transmission network of the electrical grid. The electrical measurement data is provided as input to a machine learning model to detect a reactive power anomaly that is at the distribution network, and in response to detecting the reactive power anomaly, identify a capacitor bank from a plurality of capacitor banks and associated with the transmission network of the electrical grid. In response to identifying the capacitor bank, the instructions cause the processor to cause the capacitor bank to be one of electrically coupled to the transmission network or electrically decoupled from the transmission network, to mitigate the reactive power anomaly.

BRIEF DESCRIPTION OF THE DRAWINGS

FIG. 5 shows a flow diagram illustrating a method implemented by a reactive power remediation system to cause a capacitor bank to be electrically coupled to a portion of an electrical grid, according to an embodiment.

FIG. 7 shows a flow diagram illustrating a method implemented by a reactive power remediation system to cause a capacitor bank to be electrically coupled to a transmission network to mitigate a reactive power anomaly, according to an embodiment.

DETAILED DESCRIPTION

Operators of electrical power grids typically regulate voltage to prevent under-voltage and/or over-voltage conditions (e.g., relative to normal operating voltage range) at load nodes that serve consumers. In some instances, an electrical grid can be configured to (a) inject reactive power to increase voltage within the electrical grid and/or (b) withdraw voltage to reduce voltage within the electrical grid. Reactive power can include electrical power that, during a passive phase of alternating current (AC) flow, is reflected from a load node to back to a power source of the electrical grid An electrical grid can be operably coupled to a device(s), such as a volt-ampere reactive (VAR) device (described herein), which can be configured to cause impedance and/or voltage to change within the electrical grid. At least some systems and methods described herein can be configured to trigger the device(s) based on a reactive power measurement at a distribution portion (also referred to herein as a distribution network) of the electrical grid.

Figure 1:
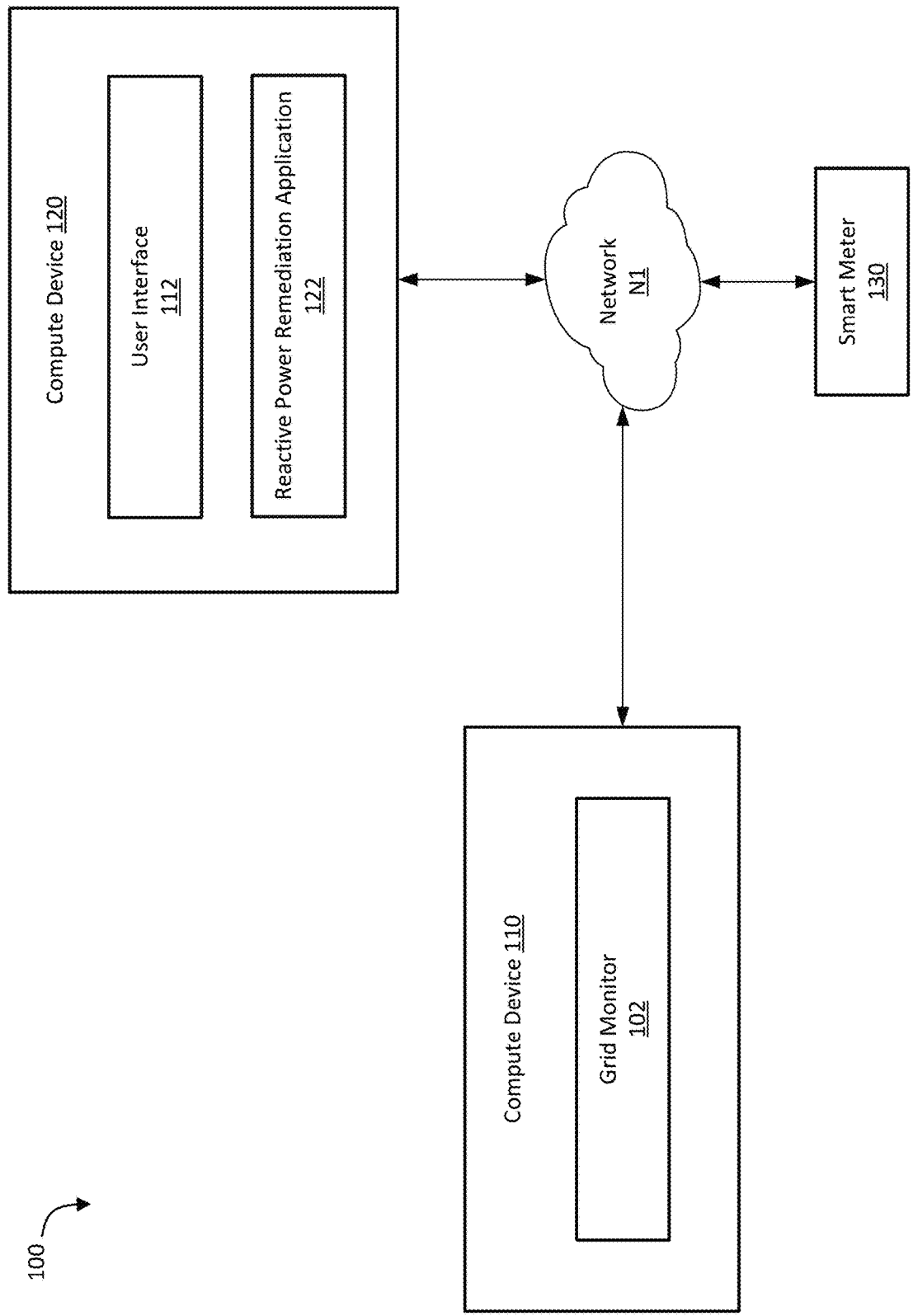
FIG. 1 shows a system block diagram of a reactive power remediation system, according to an embodiment.

FIG. 1 shows a system block diagram of a reactive power remediation system 100, according to an embodiment. The reactive power remediation system 100 includes a compute device 110, a compute device 120, a smart meter 130, and a network N1. The reactive power remediation system 100 can include alternative configurations, and various steps and/or functions of the processes described below can be shared among the various devices of the reactive power remediation system 100 or can be assigned to specific devices (e.g., the compute device 110, the compute device 120, and/or the like). For example, in some configurations, a user can provide inputs directly to the compute device 120 rather than via the compute device 110, as described herein.

In some embodiments, the compute device 110 and/or the compute device 120 can include any suitable hardware-based computing devices and/or multimedia devices, such as, for example, a server, a desktop compute device, a smartphone, a tablet, a wearable device, a laptop and/or the like. In some implementations, the compute device 110 and/or the compute device 120 can be implemented at an edge (e.g., with respect to the network N1 and/or an electrical grid) node or other remote (e.g., with respect to the network N1 and/or an electrical grid) computing facility and/or device. In some implementations, each of the compute device 110 and/or compute device 120 can be (or be included in) a data center or other control facility and/or device configured to run and/or execute a distributed computing system, and can communicate with other compute devices.

The compute device 110 can include a grid monitor 102, which can include software (1) stored at a memory that functionally and/or structurally similar to the memory 210 of FIG. 2 discussed below and (2) executed via a processor that is functionally and/or structurally similar to the processor 220 of FIG. 2 discussed below. The grid monitor 102 can receive and record measurements from the smart meter 130 (or another electrical sensor(s) couple to, for example, an Internet of Things (IoT) device). The smart meter 130 can be functionally and/or structurally similar to the smart meter 460 of FIG. 4 (described herein) and can include, for example, a voltage sensor, a current sensor, a frequency sensor, etc. The smart meter 130 can be configured to determine power quality factors, reactive power, and/or the like, for an electrical consumer such as a residential house(s), an industrial facility (and/or facilities), etc. The grid monitor 102 can further be configured to cause signals to be sent to an actuator (not shown in FIG. 1), such as a switch (e.g., multi-pole switches, contactors, etc.) that is electrically coupled to volt-ampere reactive (VAR) device, as described herein. The grid monitor 102 can include or be associated with, for example, an advanced distribution management system (ADMS) and/or a smart meter.

Figure 2:
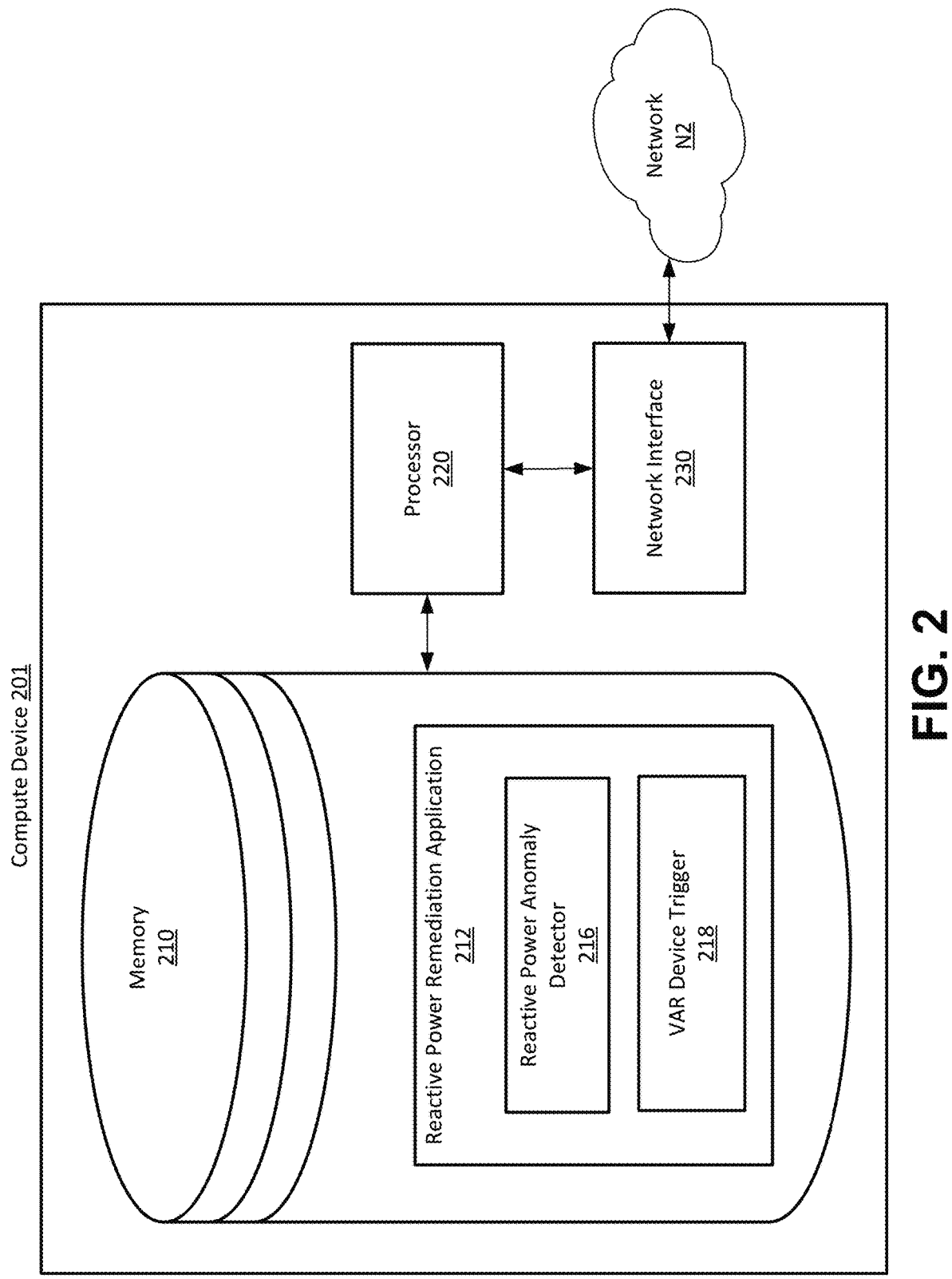
FIG. 2 shows a system block diagram of a compute device included in a reactive power remediation system, according to an embodiment.

The compute device 120 can implement a user interface 112 and a reactive power remediation application 122 (e.g., that is functionally and/or structurally equivalent to the reactive power remediation application 212 of FIG. 2 (described herein)). The user interface 112 can be (or include) a graphical user interface (GUI) (e.g., displayed on a monitor/display), and the compute device 120 can be configured to (1) receive input data (e.g., reactive power data) from a user via the user interface 112 and/or (2) cause display, via the user interface 112, of output data generated by the reactive power remediation application 122 (e.g., an indication of a reactive power anomaly, an indication of a monetary penalty levied against an operator of the electrical grid as a result of a reactive power anomaly, etc.). The reactive power remediation application 122 can be implemented via software and/or hardware. As described herein, the reactive power remediation application 122 can identify a reactive power anomaly based on measurement data received from the grid monitor 102 and, in response, cause a control signal to be sent to an actuator to mitigate the reactive power anomaly.

The compute device 110 can be networked and/or communicatively coupled to the compute device 120, via the network N1, using wired connections and/or wireless connections. The network N1 can include various configurations and protocols, including, for example, short range communication protocols, Bluetooth®, Bluetooth® LE, the Internet, World Wide Web, intranets, virtual private networks, wide area networks, local networks, private networks using communication protocols proprietary to one or more companies, Ethernet, WiFi® and/or Hypertext Transfer Protocol (HTTP), cellular data networks, satellite networks, free space optical networks and/or various combinations of the foregoing. Such communication can be facilitated by any device capable of transmitting data to and from other compute devices, such as a modem(s) and/or a wireless interface(s).

In some implementations, although not shown in FIG. 1, the reactive power remediation system 100 can include multiple compute devices 110 and/or compute devices 120. For example, in some implementations, the reactive power remediation system 100 can include a plurality of compute devices 110, where each compute device 110 can be associated with a different user from a plurality of users. In some implementations, a plurality of compute devices 110 can be associated with a single user, where each compute device 110 can be associated with, for example, a different input modality (e.g., text input, audio input, video input, etc.). Some implementations can include various combinations of the above.

FIG. 2 shows a system block diagram of a compute device 201 included in a reactive power remediation system, according to an embodiment. The compute device 201 can be structurally and/or functionally similar to, for example, the compute device 110 and/or 120 of the reactive power remediation system 100 shown in FIG. 1. The compute device 201 can be a hardware-based computing device, a multimedia device, or a cloud-based device such as, for example, a computer device, a server, a desktop compute device, a laptop, a smartphone, a tablet, a wearable device, a remote computing infrastructure, and/or the like. The compute device 201 includes a memory 210, a processor 220, and a network interface 230 operably coupled to a network N2.

The processor 220 can be, for example, a hardware-based integrated circuit (IC), or any other suitable processing device configured to run and/or execute a set of instructions or code (e.g., stored in memory 210). For example, the processor 220 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a graphics processing unit (GPU), a programmable logic controller (PLC), a remote cluster of one or more processors associated with a cloud-based computing infrastructure and/or the like. The processor 220 is operatively coupled to the memory 210. In some embodiments, for example, the processor 220 can be coupled to the memory 210 through a system bus (for example, address bus, data bus and/or control bus). In some implementations, the processor 220 can include a plurality of parallelly arranged processors.

The memory 210 can be, for example, a random-access memory (RAM), a memory buffer, a hard drive, a read-only memory (ROM), an erasable programmable read-only memory (EPROM), and/or the like. The memory 210 can store, for example, one or more software modules and/or code that can include instructions to cause the processor 220 to perform one or more processes, functions, and/or the like. In some implementations, the memory 210 can be a portable memory (e.g., a flash drive, a portable hard disk, and/or the like) that can be operatively coupled to the processor 220. In some instances, the memory can be remotely operatively coupled with the compute device 201, for example, via the network interface 230. For example, a remote database server can be operatively coupled to the compute device 201.

The memory 210 can store various instructions associated with processes, algorithms and/or data, as described herein. Memory 210 can further include any non-transitory computer-readable storage medium for storing data and/or software that is executable by processor 220, and/or any other medium which may be used to store information that may be accessed by processor 220 to control the operation of the compute device 201. For example, the memory 210 can store data associated with a reactive power remediation application 212. The reactive power remediation application 212 can be functionally and/or structurally similar to the reactive power remediation application 122 of FIG. 1 and/or the reactive power remediation application 312 of FIG. 3 (described herein).

Figure 3:
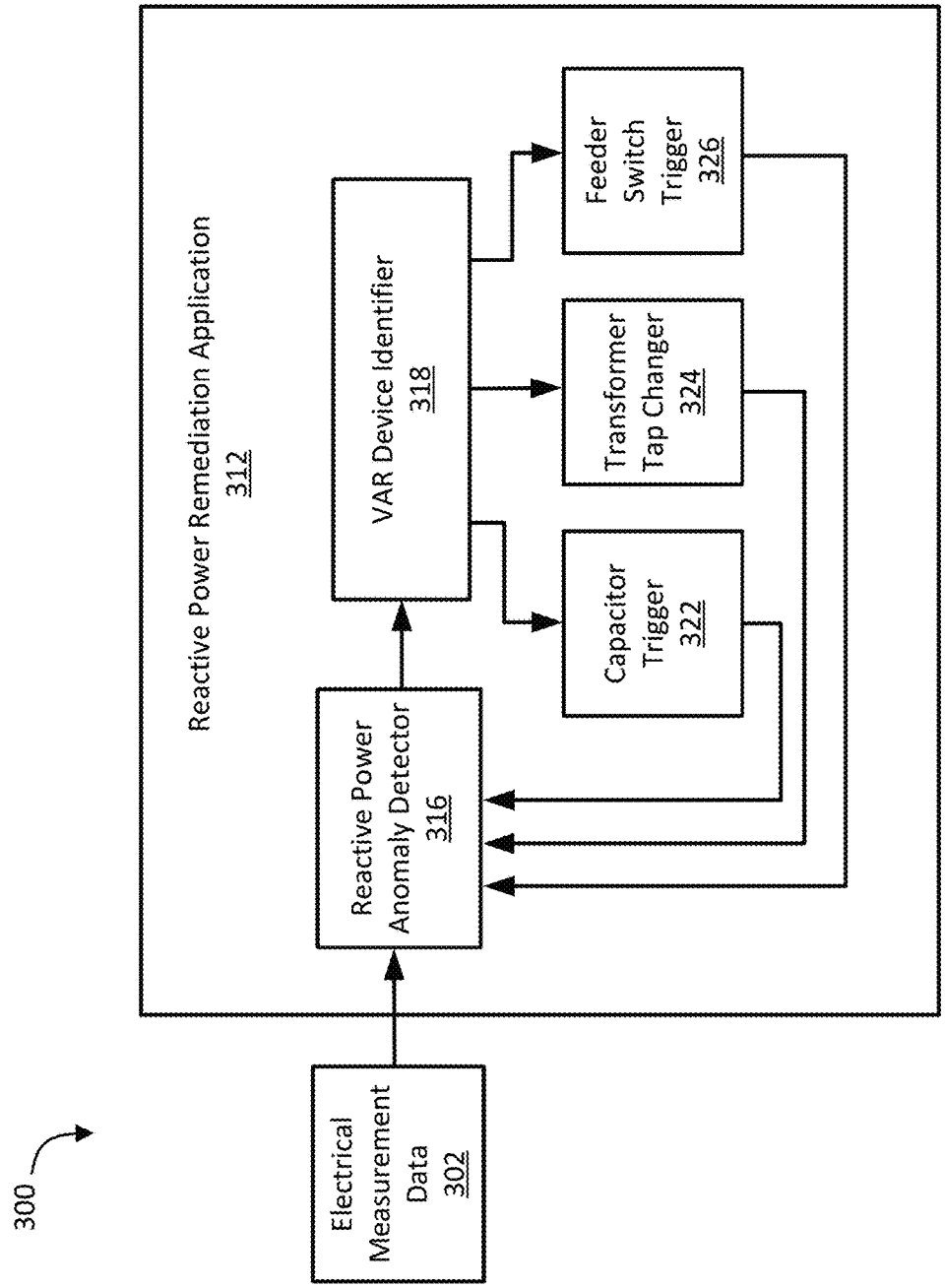
FIG. 3 shows a system block diagram of reactive power remediation components included in a reactive power remediation system, according to an embodiment.

The reactive power remediation application 212 includes a reactive power anomaly detector 216, which can be functionally and/or structurally similar to the reactive power anomaly detector 316 of FIG. 3, described further herein. The reactive power remediation application 212 also includes a volt-ampere reactive device trigger 218, which can be functionally and/or structurally similar to at least one of the capacitor trigger 322 of FIG. 3, the transformer tap changer trigger 324 of FIG. 3, and/or the feeder switch trigger 326 of FIG. 3, each of which is described further herein.

The network interface 230 can be configured to connect to the network N2, which can be functionally and/or structurally similar to the network N1 of FIG. 1. For example, network N2 can use any of the communication protocols described above with respect to network N1 of FIG. 1.

In some instances, the compute device 201 can further include a display, an input device, and/or an output interface (not shown in FIG. 2). The display can be any display device (e.g., a monitor, screen, etc.) by which the compute device 201 can output and/or display data (e.g., via a user interface that is structurally and/or functionally similar to the user interface 112 of FIG. 1). The input device can include a mouse, keyboard, touch screen, voice interface, and/or any other hand-held controller or device or interface via which a user may interact with the compute device 201. The output interface can include a bus, port, and/or other interfaces by which the compute device 201 may connect to and/or output data to other devices and/or peripherals.

FIG. 3 shows a system block diagram of reactive power remediation components 300 included in a reactive power remediation system, according to an embodiment. The reactive power remediation components 300 can be associated with a compute device (e.g., a compute device that is structurally and/or functionally similar to the compute device 201 of FIG. 2 and/or the compute devices 110 and 120 of FIG. 1). In some instances, for example, the reactive power remediation components 300 can be included in and/or associated with (1) the reactive power remediation application 122 of FIG. 1 and/or (2) the reactive power remediation application 212 of FIG. 2. In some instances, the reactive power remediation components 300 can include software stored in memory 210 and configured to execute via the processor 220 of FIG. 2. In some instances, for example, at least a portion of the reactive power remediation components 300 can be implemented in hardware (e.g., an ASIC). The reactive power remediation components 300 receive as input electrical measurement data 302, and the reactive power remediation components 300 include a reactive power remediation application 312 (e.g., that is functionally and/or structurally similar to the reactive power remediation application 122 of FIG. 1 and/or the reactive power remediation application 212 of FIG. 2). The reactive power remediation application 312 includes a reactive power anomaly detector 316 (e.g., that is functionally and/or structurally similar to the reactive power anomaly detector 216 of FIG. 2), a VAR device identifier 318, a capacitor trigger 322, a transformer tap changer trigger 324, and a feeder switch trigger 326. The capacitor trigger 322, transformer tap changer trigger 324, and feeder switch trigger 326 can be examples of a VAR device trigger that is functionally and/or structurally similar to the VAR device trigger 218 of FIG. 2.

Figure 4:
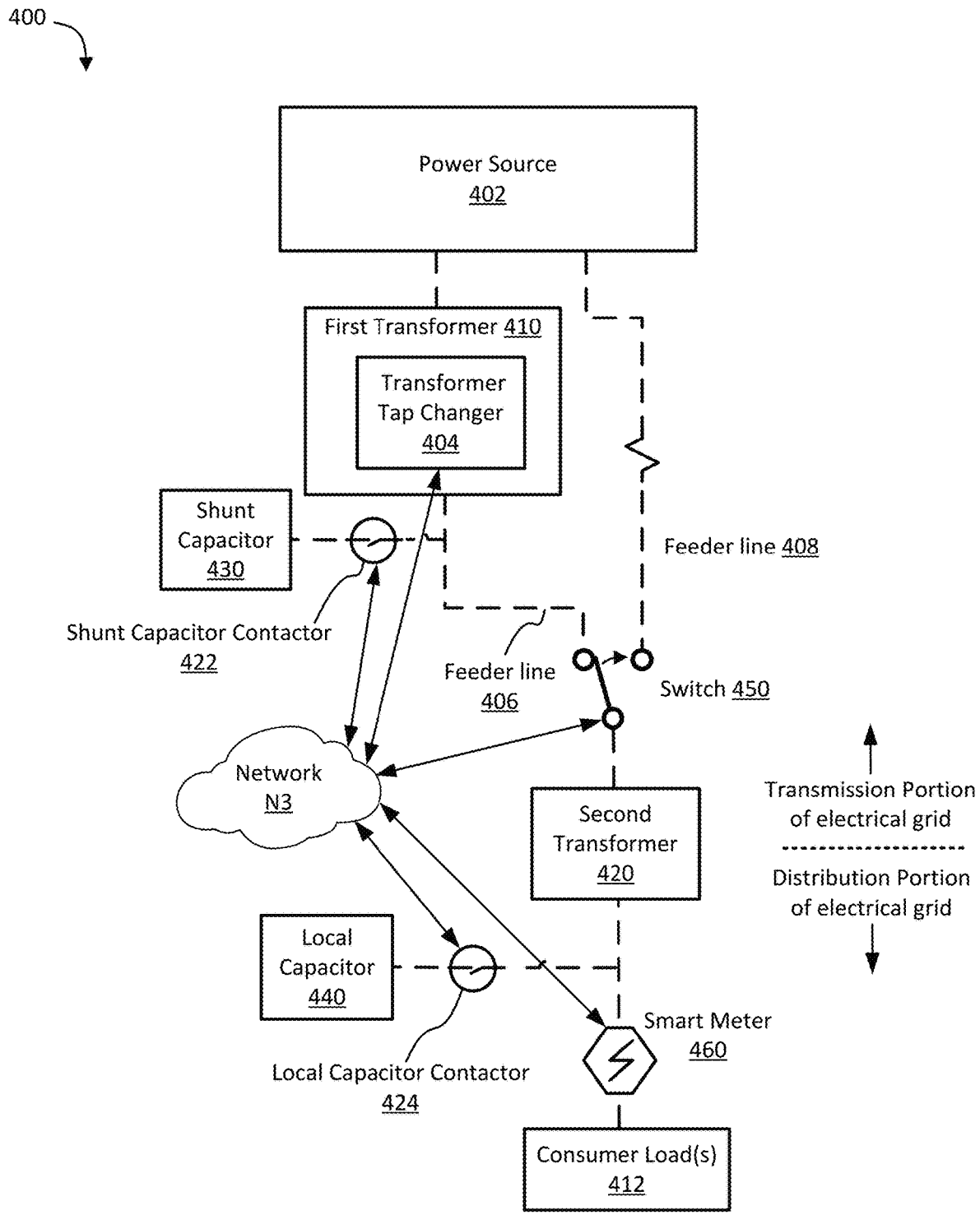
FIG. 4 shows a schematic diagram of an electrical grid, according to an embodiment.

The electrical measurement data 302 can be measured by an electrical sensor(s) that is included in, for example, a smart meter that is functionally and/or structurally similar to the smart meter 460 of FIG. 4 (described herein). In some implementations, the electrical measurement data 302 can be collected via a smart meter that is associated with a consumer (e.g., an electrical customer, such as a residential consumer, industrial consumer, etc.), a distribution transformer (e.g., that is functionally and/or structurally similar to the second transformer 420 of FIG. 4), and/or the like. In other words, the electrical measurement data 302 can be collected from a sensor/device within the distribution portion of the electrical grid. In some implementations, the electrical measurement data 302 is not collected from a sensor/device within the transmission portion of the electrical grid. The electrical measurement data 302 can represent, for example, voltage, current, real power, reactive power, apparent power, harmonics, frequency, and/or the like, at the consumer level of an electrical grid (e.g., downstream of a distribution transformer, such as the second transformer 420 of FIG. 4 (described herein)). Reactive power (Q) can be calculated (e.g., by a smart meter and/or the reactive power anomaly detector 316 (described herein)) based on the following formula, where V is voltage, I is current, and Ø is an angle between V & I:

Reactive Power $(Q)=V*I*\sin(Ø)$

Active power (P) can be determined based on the following formula:

Active Power $(P)=V*I*\cos(Ø)$

Apparent power (S) can be determined based on the following formula:

Apparent Power $(S)=V*I=\text{square root}(P^2+Q^2)$

The reactive power anomaly detector 316 can be configured to detect a reactive power anomaly within the electrical grid (e.g., within a distribution portion of the electrical grid) based on the electrical measurement data 302. In some implementations, the reactive power anomaly detector 316 can include a machine learning model (e.g., a recurrent neural network, a feed forward neural network, a random forest model, and/or the like) that is configured to receive the electrical measurement data 302 as input to determine the reactive power anomaly. Alternatively or in addition, the reactive power anomaly detector 316 can be configured to determine a real-time (or contemporaneous) voltage value, reactive power value, and/or the like of the related distribution portion of the electrical grid.

The reactive power anomaly detector 316 can compare (a) a value(s) from V, Q, P, and/or S (calculated based on and/or included in the electrical measurement data 302) to (b) a predefined threshold and/or a predefined range. The reactive power anomaly detector 316 can additionally identify a reactive power anomaly (and/or, in some instances, a voltage anomaly) within the distribution portion of the electrical grid based on the value(s) exceeding the predefined threshold, being below the predefined threshold, or being outside of the predefined range.

The VAR device identifier 318 can be configured to identify a VAR device that is electrically coupled to the electrical grid and configured to correct or improve the reactive power anomaly detected by the reactive power anomaly detector 316. For example, as described further below, the VAR device can correct or improve the reactive power anomaly to cause an anomalous reactive power value to be closer to a predefined threshold value. A VAR device can include, for example, a capacitor (or a capacitor bank), a transformer tap changer, a feeder switch, and/or any other device configured to modify an impedance of the electrical grid to cause a change in line reflections and, as a result, reactive power. In some instances, the VAR device can be from a plurality of VAR devices having a common type. For example, the identified VAR device can be within a transmission path that includes a consumer load (e.g., a consumer device, a consumer home, etc.) for which the reactive power anomaly was detected, whereas remaining VAR devices can be excluded from the transmission path. Alternatively or in addition, the VAR device can be from a plurality of VAR devices having a plurality of types. For example, the VAR device identifier 318 can be configured to identify a VAR device type based on any previous VAR devices having been identified and/or triggered (as described herein) to address the detected reactive power anomaly within the distribution portion of the electrical grid.

For example, in response to the reactive power anomaly detector 316 detecting a reactive power anomaly, the VAR device identifier 318 can be configured to search for and/or identify, for example, a capacitor (or a group of capacitors, such as a capacitor bank) before searching for and/or identifying, for example, a transformer tap changer and/or a feeder switch. In response to the VAR device identifier 318 identifying the capacitor, the capacitor trigger 322 can be configured to automatically (e.g., without human intervention) trigger (e.g., cause a signal to be sent to) a contactor (or switch and/or the like) to cause the capacitor to be (1) coupled to the electrical grid or (2) decoupled from the electrical grid. More specifically, if the reactive power anomaly detector 316 identifies that a reactive power value measured at the electrical grid is above a predefined maximum threshold value, the capacitor trigger 322 can cause the capacitor to be electrically coupled to the electrical grid. As a result of this coupling, an impedance of the electrical grid can decrease to cause reactive power to also decrease. Alternatively, if the reactive power anomaly detector 316 identifies that a reactive power value measured at the electrical grid is below a predefined minimum threshold value, the capacitor trigger 322 can cause the capacitor to be electrically decoupled from the electrical grid. As a result of this decoupling, an impedance of the electrical grid can increase to cause reactive power to also increase at least at the distribution portion of the electrical grid.

In some implementations, the VAR device identifier 318 can include a data structure (e.g., a graph data structure) that can represent positions of the VAR devices relative to consumer loads, geographic coordinates, and/or other positional identifiers of the electrical grid. Alternatively or in addition, the VAR device identifier 318 can be configured to cause a signal to be sent to the electrical grid (e.g., to a portion of the electrical grid associated with a transmission path having the reactive power anomaly), and any VAR devices that receive the signal (e.g., as a result of being in proximity to the signal) can be configured to report back a device identifier value, a device location value, etc. In some implementations, the VAR device identifier 318 can include a machine learning model configured to identify a VAR device based on that VAR device having corrected or improved a previous reactive power anomaly that affected a similar portion of the electrical grid (e.g., the same customer load) as the currently affected portion of the electrical grid.

In some implementations, the VAR device identifier 318 can include a machine learning model for each VAR device type from the plurality of VAR device types, and the VAR device identifier 318 can be configured to provide input to each machine learning model sequentially based on the associated VAR device type. For example, a first machine learning model can be associated with a capacitor VAR device type, a second machine learning model can be associated with a transformer tap changer VAR device type, and a third machine learning model can be associated with a feeder switch. The first, second, and third machine learning models can each have a common model architecture (e.g., a common neural network architecture) and different weight parameters that are determined based on respective training instances for that VAR device type. In some instances, the first, second, and third machine learning models can each be a graph neural network (GNN) that can be configured to process a graph data structure from a plurality of graph data structures associated with the plurality of VAR device types. For a given VAR device type, each graph data structure can represent the VAR devices having that VAR device type as nodes, and edges between the nodes can define distances from the VAR devices to other VAR devices, other landmarks of the electrical grid, etc. In some implementations, a common machine learning model can include the first, second, and third machine learning models.

While identifying a VAR device from a plurality of VAR devices, the VAR device identifier 318 (e.g., a machine learning model(s) within the VAR device identifier 318) can be configured to assess an impact of the VAR device to both the distribution portion associated with reactive power anomaly (e.g., the consumer load(s), such as a neighborhood, town, etc.) and another distribution portion(s) included in the electrical grid (e.g., another consumer load(s), such as another neighborhood(s), another town(s), etc.). For instance, the VAR device identifier 318 can be configured to identify VAR devices that are further downstream within the electrical grid based on the reactive power anomaly detector 316 indicating a lower magnitude of the reactive power anomaly (e.g., a smaller difference between the calculated/measured reactive power value and a threshold value). These VAR devices can, in at least some instances, be within the transmission paths of fewer consumer loads than VAR devices further upstream (e.g., within the transmission portion of the electrical grid). Alternatively or in addition, the VAR device identifier 318 can be configured to impact a higher number of consumer loads (including those that are not experiencing a reactive power anomaly) by identifying an upstream VAR device (e.g., a device in the transmission portion of the electrical grid) to mitigate a consumer(s) load experiencing a significant reactive power anomaly.

In some instances, the VAR device identifier 318 (e.g., a machine learning model(s) within the VAR device identifier 318) can be configured to learn (e.g., via a feedback signal configured for unsupervised learning) effects of a VAR device on reactive power at different distribution portions (e.g., different consumer loads) over time. For example, in some instances, a change in reactive power in response to triggering of a VAR device can differ based on, for example, a distance (as measured by transmission path) from the VAR device to the reactive power measurement point. As a result, a VAR device can have a different effect on a distribution portion that is closer to the VAR device than on a distribution portion that is further from the VAR device. The VAR device identifier 318 can therefore be configured to identify a different VAR device for a first distribution portion than for a second distribution portion, even if the respective reactive power anomalies are substantially similar.

As described further herein at least in relation to FIG. 4, in some implementations, the VAR device identifier 318 can be configured to identify a local capacitor (e.g., that is functionally and/or structurally similar to the local capacitor 440 of FIG. 4, described herein) before identifying a shunt capacitor (e.g., that is functionally and/or structurally similar to the shunt capacitor 430 of FIG. 4, described herein). For example, in response to the VAR device identifier 318 identifying a local capacitor and causing the capacitor trigger 322 to trigger an actuator associated with the local capacitor, the reactive power anomaly detector 316 can be configured to automatically check for a reactive power anomaly based on electrical measurement data 302 measured after the capacitor trigger 322 triggers the actuator. If the reactive power anomaly detector 316 detects that the previously detected reactive power anomaly persists, the VAR device identifier 318 can be configured to search for and identify a shunt capacitor. In response to the VAR device identifier 318 identifying the shunt capacitor, the capacitor trigger 322 can trigger a contactor (e.g., that is functionally and/or structurally similar to the shunt capacitor contactor 422 of FIG. 4, described herein) to cause the shunt capacitor to be coupled to or decoupled from the electrical grid.

If the reactive power anomaly detector 316 detects that the previously detected reactive power anomaly persists after the capacitor trigger 322 triggers an actuator associated with an identified capacitor (or if the VAR device identifier 318 does not identify a capacitor within the transmission path associated with the reactive power anomaly), the VAR device identifier 318 can be configured to search for and identify a transformer tap changer. The transformer tap changer can be functionally and/or structurally similar to the transformer tap changer 404 of FIG. 4 (described herein) and can be included in or associated with a transmission level transformer (e.g., that is functionally and/or structurally similar to the first transformer 410 of FIG. 4, described herein). The identified transformer tap changer can include, for example, an on-load tap changer (OLTC) that can controllably configured to vary a turn ratio of the associated transformer to increase or decrease voltage and/or reactive power. In response to identifying the transformer tap changer, the transformer tap changer trigger 324 can be configured to cause a signal to be sent to the identified transformer tap changer to cause the tap changer to modify the turn ratio of the transformer. Modifying the turn ratio of the transformer can cause the transformer to increase (e.g., if the turn ratio is increased) or decrease (e.g., if the turn ratio is decreased) voltage output, causing reactive power to also increase or decrease at least at the distribution portion of the electrical grid.

If the reactive power anomaly detector 316 detects that the previously detected reactive power anomaly persists after the transformer tap changer trigger 324 triggers an actuator associated with an transformer tap changer (or if the VAR device identifier 318 does not identify a transformer tap changer within the transmission path associated with the reactive power anomaly), the VAR device identifier 318 can be configured to search for and identify a feeder switch. The feeder switch can be functionally and/or structurally similar to the switch 450 of FIG. 4 (described herein) and can be electrically coupled to a plurality of feeders (e.g., that includes feeders that are functionally and/or structurally similar to the feeders 406 and 408 of FIG. 4, described herein). A feeder can include, for example a transmission line, and a first feeder coupled to the identified switch can have a different impedance (e.g., as a result of having a different load) than a second feeder coupled to the identified switch. In response to identifying the switch, the switch trigger 326 can be configured to cause a signal to be sent to the identified switch to cause the first feeder to be decoupled from the electrical grid and to further cause the second feeder to be coupled to the electrical grid. As a result of the first feeder and the second feeder having different impedances, the switchover from the first feeder to the second feeder can cause a change in reactive power within the distribution portion of the electrical grid. In some implementations, the switch trigger 326 can be configured to cause switchover from a feeder having a higher load to a feeder having a lower load to improve power quality at a consumer.

FIG. 4 shows a schematic diagram of an electrical grid 400, according to an embodiment. Dashed lines within FIG. 4 represent electrical power transmission, and solid arrows represent communication signals. The electrical grid 400 includes a consumer load(s) 412, which can include, for example, a city network (e.g., a plurality of residential houses), a rural network (e.g., a plurality of rural homes, a farm, etc.), a commercial and/or industrial facility, and/or the like. As described further below, the consumer load(s)

412 can be included in a distribution portion of an electrical grid having a nominal voltage of, for example, 120 V, 230 V, 480 V, etc.

The electrical grid 400 also includes a power source 402, feeder lines 406 and 408 (e.g., transmission lines), a first transformer 410, a second transformer 420, a shunt capacitor contactor 422, a shunt capacitor 430, a local capacitor contactor 424, a local capacitor 440, a switch 450 (which can be, for example, multi-pole switches, a plurality of contactors, etc.), and smart meter 460 (and/or a device, such as an electrical sensor, that is similarly configured to measure electrical parameters). The first transformer 410 includes a transformer tap changer 404. The transformer tap changer 404, the shunt capacitor contactor 422, the local capacitor contactor 424, the switch 450, and the smart meter 460 are operably (e.g., communicatively) coupled to a compute device(s) via a network N3. This compute device(s) (not shown in FIG. 4) can be functionally and/or structurally similar to the compute devices 110 and/or 120 of FIG. 1 and/or the compute device 201 of FIG. 2. For example, the compute device(s) can be configured to execute (1) a grid monitor that is functionally and/or structurally similar to the grid monitor 102 of FIG. 1 and/or (2) a reactive power remediation application that is functionally and/or structurally similar to the reactive power remediation application 122 of FIG. 1, the reactive power remediation application 212 of FIG. 2, and/or the reactive power remediation application 312 of FIG. 3. The network N3 can be functionally and/or structurally similar to the network N1 of FIG. 1 and/or the network N2 of FIG. 2.

In some implementations, a reactive power remediation application (e.g., that is executed via a compute device that is remote to the electrical grid 400 and is operably coupled to the network N3) can trigger VAR devices coupled to the electrical grid 400 by causing signals to be sent via the network N3 to the transformer tap changer 404, the shunt capacitor contactor 422, the local capacitor contactor 424, and/or the switch 450. For example, the reactive power remediation application can receive electrical measurement data (e.g., that is similar to the electrical measurement data 302) from the smart meter 460. The smart meter 460 can be configured to measure voltage (e.g., having a nominal voltage of 120 V, 230 V, and/or the like) within the distribution portion of the electrical grid 400. The reactive power remediation application can calculate a reactive power value based on the received electrical measurement data and compare this reactive power value to a predefined threshold value(s) (e.g., a maximum reactive power threshold value and/or a minimum reactive power threshold value).

The power source 402 can include a power generator, an extra high voltage (e.g., 265 kV, 275 kV, etc.) transmission line, and/or other high voltage components suitable for producing and transmitting electricity having extra high voltage. The first transformer 410 can be, for example, a step-down transformer configured to reduce electricity from extra high voltage to high voltage (e.g., 110 kV and/or the like). The first transformer 410 can include a transformer tap changer 404, which can be functionally and/or structurally similar to the transformer tap changer described at least in relation to FIG. 3. The transformer tap changer 404 can be configured to modify the voltage of electricity output from the first transformer 410 to correct or improve a voltage anomaly and/or a reactive power anomaly observed at the consumer load(s) 412.

The second transformer 420 can include, for example, a step-down transformer that can be configured to transform high voltage electricity produced by the first transformer 410, producing low voltage (e.g., 480 V, 5 kV, 50 kV, etc.) electricity. The second transformer 420 can define a boundary between a transmission portion of the electrical grid 400 (e.g., having the high voltage as a nominal voltage) and a distribution portion of the electrical grid 400 (e.g., having the low voltage as a nominal voltage). More specifically, the transmission portion of the electrical grid 400 can be upstream of the second transformer 420, and the distribution portion of the electrical grid 400 can be downstream of the second transformer 420.

The shunt capacitor contactor 422 can be configured to controllably couple and/or decouple the shunt capacitor 430 from a feeder (e.g., the feeder line 406) of the electrical grid 400. The local capacitor contactor 424 can be configured to controllably couple and/or decouple the local capacitor 440 from a feeder (e.g., the feeder line 406) of the electrical grid 400. The shunt capacitor 430 can be included in the transmission portion of the electrical grid 400, and the local capacitor 440 can be included in the distribution portion of the grid 400.

The switch 450 can be controllably actuatable to cause the feeder lines 406 and 408 to be coupled to and/or decoupled from the electrical grid 400. For example, the reactive power remediation application can cause a signal to be generated that, when received at the switch 450 via the network N3, actuates the switch 450 to cause the switch 450 to electrically decouple from the feeder line 406 and electrically couple to the feeder line 408. As a result, the electrical grid 400 can deliver electrical power from the power source 402 to the consumer load(s) 412 via a transmission path that has a lower load or another characteristic, improving power quality at the consumer load(s) 412.

The smart meter 460 can be associated with, for example, a smart meter disposed at the consumer load(s) 412, the second transformer 420, and/or elsewhere within the distribution portion of the electrical grid 400. The smart meter 460 can be configured to measure voltage, current, real power, reactive power, apparent power, harmonics, frequency, and/or other electrical characteristics at or near, for example, the consumer load(s) 412, the second transformer 420, etc., of the distribution portion of the electrical grid.

As described at least in relation to FIG. 3, the reactive power remediation application can be configured identify VAR devices based on a predefined sequence of VAR device types. This predefined sequence can include for example, a local capacitor type, a shunt capacitor type, a transformer tap changer type, and/or a feeder switch type. For example, the reactive power remediation application can be configured to receive electrical measurement data (e.g., that is similar to the electrical measurement data 302 of FIG. 3) from the smart meter 460. Based on this electrical measurement data, the reactive power remediation application can include a reactive power anomaly detector (e.g., that is functionally and/or structurally similar to the reactive power anomaly detector 316 of FIG. 3) to detect a voltage anomaly and/or a reactive power anomaly within the distribution portion of the electrical grid 400. In response to detecting the anomaly, the reactive power remediation application can be configured to identify the local capacitor 440 (e.g., from a plurality of local capacitors, not shown in FIG. 4) based on the local capacitor 440 being couplable (via the local capacitor contactor 424) to a transmission path between the power source 402 and the consumer load(s) 412. The reactive power remediation application can cause a signal to be sent to the local capacitor contactor 424 to cause the local capacitor 440 to be coupled to or decoupled from the transmission path to decrease or increase reactive power, respectively.

The reactive power remediation application can then automatically receive additional electrical measurement data that was measured via the smart meter 460 after the signal was sent to the local capacitor contactor 424 (e.g., after the change in reactive power). If the reactive power remediation application determines that the anomaly within the distribution portion of the electrical grid 400 persists based on the updated electrical measurement data, the reactive power remediation application can be configured to identify the shunt capacitor 430. The reactive power remediation application can then cause a signal to be sent to the shunt capacitor contactor 422 to cause the shunt capacitor 430 to be coupled to or decoupled from the transmission path to decrease or increase reactive power, respectively. In at least some instances, the reactive power remediation application can be configured to identify the local capacitor 440 before identifying the shunt capacitor 430 to first attempt to remediate the anomaly using a device within the affected distribution portion of the electrical grid while not affecting parallel distribution portions (not shown in FIG. 4). Should this remediation be insufficient in resolving the anomaly, the reactive power remediation application can then be configured to identify the upstream (e.g., as to the local capacitor 440) shunt capacitor 430 to attempt to resolve the anomaly (while potentially also affecting the parallel distribution portions of the electrical grid 400).

If the reactive power remediation application determines that neither the shunt capacitor 430 nor the local capacitor 440 corrects the anomaly, the reactive power remediation application can identify the transformer tap changer 404 and cause a signal to be sent to the transformer tap changer 404 to modify a turn ratio of the first transformer 410. In response, the first transformer 410 can output electricity having a different voltage than before the modification of the turn ratio. This electricity having the modified voltage can cause a change in reactive power as observed at the downstream consumer load(s) 412.

The reactive power remediation application can be further configured to cause a signal to be sent to the switch 450 in response to determining that the anomaly persists after causing the modification to the turn ratio of the transformer 410. The signal can cause a switchover from, for example, the feeder line 406 to the feeder line 408, such that the feeder line 408 and not the feeder line 406 is included in the transmission path between the power source 402 and the consumer load(s) 412. The feeder line 408 can be associated with a lower load than the feeder 406 and/or can have an impedance value that is more desirable than impedance value of the feeder 406 for causing the electrical grid 400 to have a desired reactive power value.

FIG. 5 shows a flow diagram illustrating a method 500 implemented by a reactive power remediation system to cause a capacitor bank to be electrically coupled to a portion of an electrical grid, according to an embodiment. The method 500 can be implemented by a reactive power remediation system described herein (e.g., the reactive power remediation system 100 of FIG. 1). Portions of the method 500 can be implemented using a processor (e.g., the processor 220 of FIG. 2) of any suitable compute device (e.g., the compute device 201 of FIG. 2 and/or the compute devices 110 and/or 120 of FIG. 1).

The method 500 at 502 includes receiving, at a processor, electrical measurement data that represents a characteristic of a first portion of an electrical grid and not a second portion of the electrical grid, the first portion of the electrical grid having a first nominal voltage, and the second portion of the electrical grid having at least one second nominal voltage that is higher than the first nominal voltage. The electrical measurement data is provided as input, via the processor, to a machine learning model at 504 to (1) detect a reactive power anomaly within the electrical grid and (2) in response to detecting the reactive power anomaly, identify a capacitor bank from a plurality of capacitor banks and associated with the second portion of the electrical grid. In response to identifying the capacitor bank, the method 500 at 506 includes triggering a contactor, via the processor, to cause the capacitor bank to be electrically coupled to the second portion of the electrical grid to mitigate the reactive power anomaly.

Figure 6:
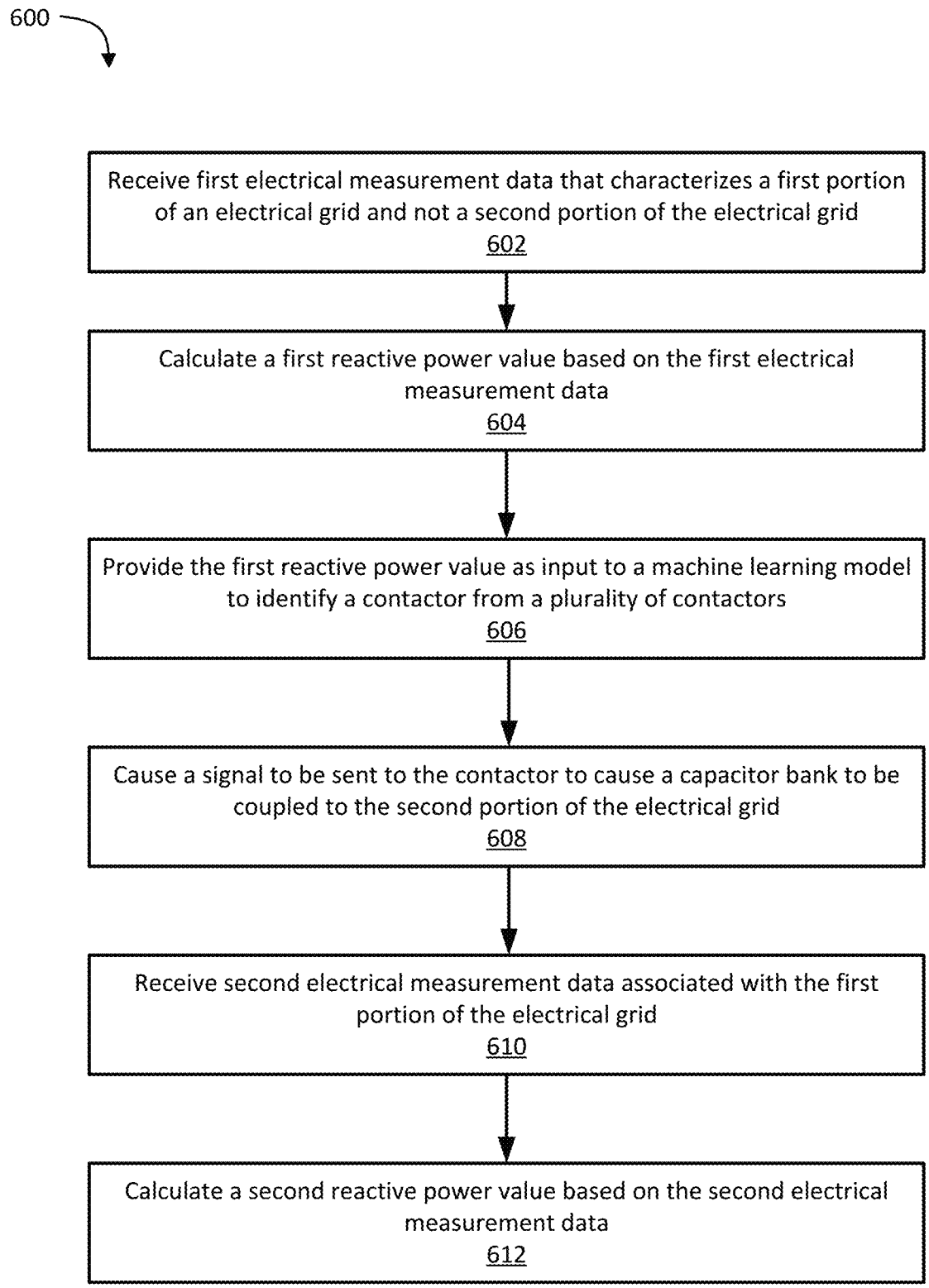
FIG. 6 shows a flow diagram illustrating a method implemented by a reactive power remediation system to identify a contactor from a plurality of contactors, according to an embodiment.

FIG. 6 shows a flow diagram illustrating a method 600 implemented by a reactive power remediation system to identify a contactor from a plurality of contactors, according to an embodiment. The method 600 can be implemented by a reactive power remediation system described herein (e.g., the reactive power remediation system 100 of FIG. 1). Portions of the method 600 can be implemented using a processor (e.g., the processor 220 of FIG. 2) of any suitable compute device (e.g., the compute device 201 of FIG. 2 and/or the compute devices 110 and/or 120 of FIG. 1).

The method 600 at 602 includes receiving first electrical measurement data that characterizes a first portion of an electrical grid and not a second portion of the electrical grid, the first portion of the electrical grid having a first nominal voltage, and the second portion of the electrical grid having at least one second nominal voltage that is higher than the first nominal voltage. At 604, the method 600 includes calculating a first reactive power value based on the first electrical measurement data, the first reactive power value being (1) associated with the first portion of the electrical grid and (2) outside of a predefined reactive power value range. The first reactive power value is provided as input to a machine learning model at 606 to identify a contactor from a plurality of contactors, each contactor from the plurality of contactors being associated with (1) a capacitor bank different from remaining capacitor banks from a plurality of capacitor banks and (2) the second portion of the electrical grid. In response to identifying the contactor, a signal is sent to the contactor at 608 to cause a capacitor bank (1) associated with that contactor and (2) from the plurality of capacitor banks to be coupled to the second portion of the electrical grid. In response to the signal being sent to the contactor, second electrical measurement data associated with the first portion of the electrical grid is received at 610, and a second reactive power value is calculated at 612 based on the second electrical measurement data. The second reactive power value is one of (1) within the predefined reactive power value range or (2) closer to the predefined reactive power value range than the first reactive power value.

FIG. 7 shows a flow diagram illustrating a method 700 implemented by a reactive power remediation system to cause a capacitor bank to be electrically coupled to a transmission network to mitigate a reactive power anomaly, according to an embodiment. The method 700 can be implemented by a reactive power remediation system described herein (e.g., the reactive power remediation system 100 of FIG. 1). Portions of the method 700 can be implemented using a processor (e.g., the processor 220 of FIG. 2) of any suitable compute device (e.g., the compute device 201 of FIG. 2 and/or the compute devices 110 and/or 120 of FIG. 1).

The method 700 at 702 includes receiving electrical measurement data measured at a distribution network of an electrical grid and not a transmission network of the electrical grid. The electrical measurement data is provided as input to a machine learning model at 704 to detect a reactive power anomaly that is at the distribution network, and in response to detecting the reactive power anomaly, identify a capacitor bank from a plurality of capacitor banks and associated with the transmission network of the electrical grid. In response to identifying the capacitor bank, the capacitor bank is electrically coupled to the transmission network at 706 to mitigate the reactive power anomaly.

According to an embodiment, a method includes receiving, at a processor, electrical measurement data that represents a characteristic of a first portion of an electrical grid and not a second portion of the electrical grid, the first portion of the electrical grid having a first nominal voltage, and the second portion of the electrical grid having at least one second nominal voltage that is higher than the first nominal voltage. The electrical measurement data is provided as input, via the processor, to a machine learning model to (1) detect a reactive power anomaly within the electrical grid and (2) in response to detecting the reactive power anomaly, identify a capacitor bank from a plurality of capacitor banks and associated with the second portion of the electrical grid. In response to identifying the capacitor bank, the method also includes triggering a contactor, via the processor, to cause the capacitor bank to be one of electrically coupled to the second portion of the electrical grid or electrically decoupled from the second portion of the electrical grid, to mitigate the reactive power anomaly.

In some implementations, the electrical measurement data can be first electrical measurement data, the reactive power anomaly can be a first reactive power anomaly, and the method can further include, in response to triggering the contactor, receiving, via the processor, second electrical measurement data associated with the first portion of the electrical grid. The second electrical measurement data can be provided as input, via the processor, to the machine learning model to detect a second reactive power anomaly, and in response to detecting the second reactive power anomaly, identify a transformer from a plurality of transformers, the transformer being associated with the second portion of the electrical grid and including a tap changer. In response to identifying the transformer, the method can include triggering the tap changer, via the processor, to modify a turn ratio of the transformer to mitigate the second reactive power anomaly.

In some implementations, the method can further include, in response to triggering the tap changer, receiving, via the processor, third electrical measurement data associated with the first portion of the electrical grid. The third electrical measurement data can be provided as input, via the processor, to the machine learning model to detect a third reactive power anomaly. In response to detecting the third reactive power anomaly, the machine learning model can identify a switch from a plurality of switches, the switch being associated with (1) a first feeder that is from the second portion of the electrical grid and is electrically coupled via the switch to the first portion of the electrical grid and (2) a second feeder that is from the second portion of the electrical grid and is electrically decoupled from the first portion of the electrical grid. In response to identifying the switch, the method can include triggering the switch, via the processor, to (1) electrically decouple the first feeder from the first portion of the electrical grid, (2) electrically couple the second feeder to the first portion of the electrical grid, and (3) mitigate the third reactive power anomaly.

In some implementations, the electrical measurement data can be received from a smart meter associated with an electricity consumer. In some implementations, the electrical measurement data can be received from an advanced distribution management system (ADMS) associated with the electrical grid. In some implementations, the electrical measurement data can include at least one of voltage data, current data, or frequency data. In some implementations, the first portion of the electrical grid can include a distribution network and exclude a transmission network, and the second portion of the electrical grid can include the transmission network and exclude the distribution network.

According to an embodiment, a non-transitory, processor-readable medium stores instructions that, when executed by a processor, cause the processor to receive first electrical measurement data that characterizes a first portion of an electrical grid and not a second portion of the electrical grid, the first portion of the electrical grid having a first nominal voltage, and the second portion of the electrical grid having at least one second nominal voltage that is higher than the first nominal voltage. The instructions also cause the processor to calculate a first reactive power value based on the first electrical measurement data, the first reactive power value being (1) associated with the first portion of the electrical grid and (2) outside of a predefined reactive power value range. The first reactive power value is provided as input to a machine learning model to identify a contactor from a plurality of contactors, each contactor from the plurality of contactors being associated with (1) a capacitor bank different from remaining capacitor banks from a plurality of capacitor banks and (2) the second portion of the electrical grid. In response to identifying the contactor, a signal is sent to the contactor to cause a capacitor bank (1) associated with that contactor and (2) from the plurality of capacitor banks to be one of coupled to the second portion of the electrical grid or decoupled from the second portion of the electrical grid. In response to the signal being sent to the contactor, second electrical measurement data associated with the first portion of the electrical grid is received, and a second reactive power value is calculated based on the second electrical measurement data. The second reactive power value is one of (1) within the predefined reactive power value range or (2) closer to the predefined reactive power value range than the first reactive power value.

In some implementations, the machine learning model can be a first machine learning model, the signal can be a first signal, and the non-transitory, processor-readable medium can further store instructions to cause the processor to, in response to calculating the second reactive power value, provide the second reactive power value as input to a second machine learning model to identify a transformer from a plurality of transformers, the transformer being associated with the second portion of the electrical grid and including a tap changer, and the second reactive power value being outside of the predefined reactive power value range. The instructions can also cause the processor to, in response to identifying the transformer, cause a second signal to be sent to the tap changer to modify a turn ratio of the transformer based on the second reactive power value and the predefined reactive power value range. In response to causing the second signal to be sent, third electrical measurement data associated with the first portion of the electrical grid can be received, and a third reactive power value can be calculated based on the third electrical measurement data, the third reactive power value being one of (1) within the predefined reactive power value range or (2) outside of the predefined reactive power value range and closer to the predefined reactive power value range than the second reactive power value.

In some implementations, the non-transitory, processor-readable medium can further store instructions to cause the processor to, in response to calculating the third reactive power value, provide the third reactive power value as input to a third machine learning model to identify a switch from a plurality of switches, the switch being associated with (1) a first feeder that is from the second portion of the electrical grid and is electrically coupled via the switch to the first portion of the electrical grid and (2) a second feeder that is from the second portion of the electrical grid and is electrically decoupled from the first portion of the electrical grid, the third reactive power value being outside of the predefined reactive power value range, and a load of the first feeder being less than a load of the second feeder. In response to identifying the switch, the instructions can cause the processor to cause a third signal to be sent to the switch to electrically decouple the first feeder from the first portion of the electrical grid and electrically couple the second feeder to the first portion of the electrical grid. In response to causing the third signal to be sent, fourth electrical measurement data associated with the first portion of the electrical grid can be received, and a fourth reactive power value can be calculated based on the third electrical measurement data, the fourth reactive power value being within the predefined reactive power value range.

In some implementations, the first electrical measurement data and the second electrical measurement data can each be received from a smart meter associated with an electricity consumer. In some implementations, the first electrical measurement data and the second electrical measurement data can each be received from an advanced distribution management system (ADMS) associated with the electrical grid. In some implementations, the first electrical measurement data and the second electrical measurement data can each include at least one of voltage data, current data, or frequency data. In some implementations, the first portion of the electrical grid can include a distribution network and exclude a transmission network, and the second portion of the electrical grid can include the transmission network and exclude the distribution network.

According to an embodiment, a non-transitory, processor-readable medium stores instructions that, when executed by a processor, cause the processor to receive electrical measurement data measured at a distribution network of an electrical grid and not a transmission network of the electrical grid. The electrical measurement data is provided as input to a machine learning model to detect a reactive power anomaly that is at the distribution network, and in response to detecting the reactive power anomaly, identify a capacitor bank from a plurality of capacitor banks and associated with the transmission network of the electrical grid. In response to identifying the capacitor bank, the instructions cause the processor to cause the capacitor bank to be one of electrically coupled to the transmission network or electrically decoupled from the transmission network, to mitigate the reactive power anomaly.

In some implementations, the electrical measurement data can be first electrical measurement data, the reactive power anomaly can be a first reactive power anomaly, and the non-transitory, processor-readable medium can further store instructions to cause the processor to, in response to causing the capacitor bank to be electrically coupled to the transmission network, receive second electrical measurement data associated with the distribution network. The second electrical measurement data can be provided as input to the machine learning model to detect a second reactive power anomaly and, in response to detecting the second reactive power anomaly, identify a transformer from a plurality of transformers, the transformer being associated with the transmission network and including a tap changer. In response to identifying the transformer, the instructions can cause the processor to trigger the tap changer to modify a turn ratio of the transformer to mitigate the second reactive power anomaly.

In some implementations, the non-transitory, processor-readable medium can further store instructions to cause the processor to, in response to triggering the tap changer, receive third electrical measurement data associated with the distribution network and provide the third electrical measurement data as input to the machine learning model to detect a third reactive power anomaly. In response to detecting the third reactive power anomaly, the machine learning model can identify a switch from a plurality of switches, the switch being associated with (1) a first feeder that is from the transmission network and is electrically coupled via the switch to the distribution network and (2) a second feeder that is from the transmission network and is electrically decoupled from the distribution network. In response to identifying the switch, the switch can be triggered to (1) electrically decouple the first feeder from the distribution network, (2) electrically couple the second feeder to distribution network, and (3) mitigate the third reactive power anomaly.

In some implementations, the electrical measurement data can be received from a smart meter associated with an electricity consumer. In some implementations, the electrical measurement data can be received from an advanced distribution management system (ADMS) associated with the electrical grid. In some implementations, the electrical measurement data includes at least one of voltage data, current data, or frequency data.

Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using Python, Java, JavaScript, C++, and/or other programming languages and development tools. Additional examples of computer code include, but are not limited to, control signals, encrypted code, and compressed code.

The drawings primarily are for illustrative purposes and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The acts performed as part of a disclosed method(s) can be ordered in any suitable way. Accordingly, embodiments can be constructed in which processes or steps are executed in an order different than illustrated, which can include performing some steps or processes simultaneously, even though shown as sequential acts in illustrative embodiments. Put differently, it is to be understood that such features can not necessarily be limited to a particular order of execution, but rather, any number of threads, processes, services, servers, and/or the like that can execute serially, asynchronously, concurrently, in parallel, simultaneously, synchronously, and/or the like in a manner consistent with the disclosure. As such, some of these features can be mutually contradictory, in that they cannot be simultaneously present in a single embodiment. Similarly, some features are applicable to one aspect of the innovations, and inapplicable to others.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments described herein relate to a computer storage product with a non-transitory computer-readable medium (also can be referred to as a non-transitory processor-readable medium and/or a machine-readable medium) having instructions or computer code thereon for performing various computer-implemented operations. The computer-readable medium (or processor-readable medium, machine-readable medium, etc.) is non-transitory in the sense that it does not include transitory propagating signals per se (e.g., a propagating electromagnetic wave carrying information on a transmission medium such as space or a cable). The media and computer code (also can be referred to as code) can be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules can include, for example, a processor, a field programmable gate array (FPGA), and/or an application specific integrated circuit (ASIC). Software modules (executed on hardware) can include instructions stored in a memory that is operably coupled to a processor and can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

What is claimed is:

1. A method, comprising:
receiving, at a processor, electrical measurement data that represents a characteristic of a first portion of an electrical grid and not a second portion of the electrical grid, the first portion of the electrical grid having a first nominal voltage, and the second portion of the electrical grid having at least one second nominal voltage that is higher than the first nominal voltage;
providing the electrical measurement data as input, via the processor, to a machine learning model to:
detect a reactive power anomaly within the electrical grid, and
in response to detecting the reactive power anomaly, identify a capacitor bank from a plurality of capacitor banks and associated with the second portion of the electrical grid; and
in response to identifying the capacitor bank, triggering a contactor, via the processor, to cause the capacitor bank to be one of electrically coupled to the second portion of the electrical grid or electrically decoupled from the second portion of the electrical grid, to mitigate the reactive power anomaly, wherein the first portion of the electrical grid includes a distribution network and excludes a transmission network; and the second portion of the electrical grid includes the transmission network and excludes the distribution network.

2. The method of claim 1, wherein the electrical measurement data is first electrical measurement data, and the reactive power anomaly is a first reactive power anomaly, the method further comprising:
in response to triggering the contactor, receiving, via the processor, second electrical measurement data associated with the first portion of the electrical grid;
providing the second electrical measurement data as input, via the processor, to the machine learning model to:
detect a second reactive power anomaly, and
in response to detecting the second reactive power anomaly, identify a transformer from a plurality of transformers, the transformer being associated with the second portion of the electrical grid and including a tap changer; and
in response to identifying the transformer, triggering the tap changer, via the processor, to modify a turn ratio of the transformer to mitigate the second reactive power anomaly.

3. The method of claim 2, further comprising:
in response to triggering the tap changer, receiving, via the processor, third electrical measurement data associated with the first portion of the electrical grid;
providing the third electrical measurement data as input, via the processor, to the machine learning model to:
detect a third reactive power anomaly, and
in response to detecting the third reactive power anomaly, identify a switch from a plurality of switches, the switch being associated with (1) a first feeder that is from the second portion of the electrical grid and is electrically coupled via the switch to the first portion of the electrical grid and (2) a second feeder that is from the second portion of the electrical grid and is electrically decoupled from the first portion of the electrical grid; and
in response to identifying the switch, triggering the switch, via the processor, to (1) electrically decouple the first feeder from the first portion of the electrical grid, (2) electrically couple the second feeder to the first portion of the electrical grid, and (3) mitigate the third reactive power anomaly.

4. The method of claim 1, wherein the electrical measurement data is received from a smart meter associated with an electricity consumer.

5. The method of claim 1, wherein the electrical measurement data is received from an advanced distribution management system (ADMS) associated with the electrical grid.

6. The method of claim 1, wherein the electrical measurement data includes at least one of voltage data, current data, or frequency data.

7. A non-transitory, processor-readable medium storing instructions that, when executed by a processor, cause the processor to:
receive first electrical measurement data that characterizes a first portion of an electrical grid and not a second portion of the electrical grid, the first portion of the electrical grid having a first nominal voltage, and the second portion of the electrical grid having at least one second nominal voltage that is higher than the first nominal voltage;
calculate a first reactive power value based on the first electrical measurement data, the first reactive power value being (1) associated with the first portion of the electrical grid and (2) outside of a predefined reactive power value range;
provide the first reactive power value as input to a machine learning model to identify a contactor from a plurality of contactors, each contactor from the plurality of contactors being associated with (1) a capacitor bank different from remaining capacitor banks from a plurality of capacitor banks and (2) the second portion of the electrical grid;
in response to identifying the contactor, cause a signal to be sent to the contactor to cause a capacitor bank (1) associated with that contactor and (2) from the plurality of capacitor banks to be one of coupled to the second portion of the electrical grid or decoupled from the second portion of the electrical grid; and
in response to causing the signal to be sent to the contactor:
receive second electrical measurement data associated with the first portion of the electrical grid, and
calculate a second reactive power value based on the second electrical measurement data, the second reactive power value being one of (1) within the predefined reactive power value range or (2) closer to the predefined reactive power value range than the first reactive power value.

8. The non-transitory, processor-readable medium of claim 7, wherein the machine learning model is a first machine learning model, the signal is a first signal, and the non-transitory, processor-readable medium further stores instructions to cause the processor to:
in response to calculating the second reactive power value, provide the second reactive power value as input to a second machine learning model to identify a transformer from a plurality of transformers, the transformer being associated with the second portion of the electrical grid and including a tap changer, and the second reactive power value being outside of the predefined reactive power value range;

in response to identifying the transformer, cause a second signal to be sent to the tap changer to modify a turn ratio of the transformer based on the second reactive power value and the predefined reactive power value range; and in response to causing the second signal to be sent:
receive third electrical measurement data associated with the first portion of the electrical grid, and
calculate a third reactive power value based on the third electrical measurement data, the third reactive power value being one of (1) within the predefined reactive power value range or (2) outside of the predefined reactive power value range and closer to the predefined reactive power value range than the second reactive power value.

9. The non-transitory, processor-readable medium of claim 8, further storing instructions to cause the processor to:

in response to calculating the third reactive power value, provide the third reactive power value as input to a third machine learning model to identify a switch from a plurality of switches, the switch being associated with (1) a first feeder that is from the second portion of the electrical grid and is electrically coupled via the switch to the first portion of the electrical grid and (2) a second feeder that is from the second portion of the electrical grid and is electrically decoupled from the first portion of the electrical grid, the third reactive power value being outside of the predefined reactive power value range, and a load of the first feeder being less than a load of the second feeder;

in response to identifying the switch, cause a third signal to be sent to the switch to electrically decouple the first feeder from the first portion of the electrical grid and electrically couple the second feeder to the first portion of the electrical grid; and in response to causing the third signal to be sent:
receive fourth electrical measurement data associated with the first portion of the electrical grid, and
calculate a fourth reactive power value based on the third electrical measurement data, the fourth reactive power value being within the predefined reactive power value range.

10. The non-transitory, processor-readable medium of claim 7, wherein the first electrical measurement data and the second electrical measurement data are each received from a smart meter associated with the first portion of the electrical grid.

11. The non-transitory, processor-readable medium of claim 7, wherein the first electrical measurement data and the second electrical measurement data are each received from an advanced distribution management system (ADMS) associated with the electrical grid.

12. The non-transitory, processor-readable medium of claim 7, wherein the first electrical measurement data and the second electrical measurement data each includes at least one of voltage data, current data, or frequency data.

13. The non-transitory, processor-readable medium of claim 7, wherein:
the first portion of the electrical grid includes a distribution network and excludes a transmission network; and
the second portion of the electrical grid includes the transmission network and excludes the distribution network.

14. A non-transitory, processor-readable medium storing instructions that, when executed by a processor, cause the processor to:

receive electrical measurement data measured at a distribution network of an electrical grid and not a transmission network of the electrical grid;
provide the electrical measurement data as input to a machine learning model to:
detect a reactive power anomaly that is at the distribution network, and
in response to detecting the reactive power anomaly, identify a capacitor bank from a plurality of capacitor banks and associated with the transmission network of the electrical grid; and
in response to identifying the capacitor bank, cause the capacitor bank to be one of electrically coupled to the transmission network or electrically decoupled from the transmission network, to mitigate the reactive power anomaly.

15. The non-transitory, processor-readable medium of claim 14, wherein the electrical measurement data is first electrical measurement data, the reactive power anomaly is a first reactive power anomaly, and the non-transitory, processor-readable medium further stores instructions to cause the processor to:

in response to causing the capacitor bank to be one of electrically coupled to the transmission network or electrically decoupled from the transmission network, receive second electrical measurement data associated with the distribution network;
provide the second electrical measurement data as input to the machine learning model to:
detect a second reactive power anomaly, and
in response to detecting the second reactive power anomaly, identify a transformer from a plurality of transformers, the transformer being associated with the transmission network and including a tap changer; and
in response to identifying the transformer, trigger the tap changer to modify a turn ratio of the transformer to mitigate the second reactive power anomaly.

16. The non-transitory, processor-readable medium of claim 15, further storing instructions to cause the processor to:

in response to triggering the tap changer, receive third electrical measurement data associated with the distribution network;
provide the third electrical measurement data as input to the machine learning model to:
detect a third reactive power anomaly, and
in response to detecting the third reactive power anomaly, identify a switch from a plurality of switches, the switch being associated with (1) a first feeder that is from the transmission network and is electrically coupled via the switch to the distribution network and (2) a second feeder that is from the transmission network and is electrically decoupled from the distribution network; and
in response to identifying the switch, trigger the switch to (1) electrically decouple the first feeder from the distribution network, (2) electrically couple the second feeder to distribution network, and (3) mitigate the third reactive power anomaly.

17. The non-transitory, processor-readable medium of claim 14, wherein the electrical measurement data is received from a smart meter associated with the distribution network.

18. The non-transitory, processor-readable medium of claim 14, wherein the electrical measurement data is received from an advanced distribution management system (ADMS) associated with the electrical grid.

19. The non-transitory, processor-readable medium of claim 14, wherein the electrical measurement data includes at least one of voltage data, current data, or frequency data.

* * * * *